(12) United States Patent
Scarborough

(10) Patent No.: US 6,546,891 B1
(45) Date of Patent: Apr. 15, 2003

(54) CAPTURED SEAT FOR SELF-PROPELLED WATERCRAFT AND METHOD FOR FORMING SAME

(75) Inventor: Charles S. Scarborough, Rockwood, TN (US)

(73) Assignee: Dagger, Inc., Harriman, TN (US)

( * ) Notice: Subject to any disclaimer, the term of this patent is extended or adjusted under 35 U.S.C. 154(b) by 0 days.

(21) Appl. No.: 09/924,744

(22) Filed: Aug. 8, 2001

(51) Int. Cl.7 .............................................. B63B 17/00
(52) U.S. Cl. ....................................................... 114/363
(58) Field of Search ................................. 114/363, 347

(56) References Cited

U.S. PATENT DOCUMENTS 4,229,850 A * 10/1980 Arcouette ................... 114/347

* cited by examiner

Primary Examiner—Jesus D. Sotelo
(74) Attorney, Agent, or Firm—Pitts & Brittian, P.C.

(57) ABSTRACT

A self-propelled watercraft referred to herein as vessel (10), such as, though not limited to, a kayak or the like. At least two ridges (34) and (36) are provided in the hull bottom (17) in spaced relation from one another. Likewise, at least two ridges (44) and (46), in spaced relation from one another, are provided in seat bottom (30). In one embodiment, the distance (60) between ridges (34) and (36) is greater than the distance (65) between ridges (44) and (46) such that ridges (44) and (46) are captured by ridges (34) and (36) thus preventing undesired lateral movement of the seat (25) within the interior volume (50) of the hull (15). The seat (25) is positioned lower in the hull than with a traditional seat, thus lowering the center of gravity for the vessel (10) when an occupant is seated, making the vessel (10) more stable in the water. In order to prevent undesired bridging of molten plastic between ridges (34) and (44) and between ridges (36) and (46) during the molding process, the seat (25) is molded in an elevated position. Upon removal of the vessel (10) from the mold, i.e. after skinning, but while the thermomolded plastic is still pliable, the seat (25) is pressed downward to the desired lower position. The plastic is allowed to reach room temperature and the plastic hardens sufficiently for the vessel (10) to retain this configuration.

13 Claims, 5 Drawing Sheets

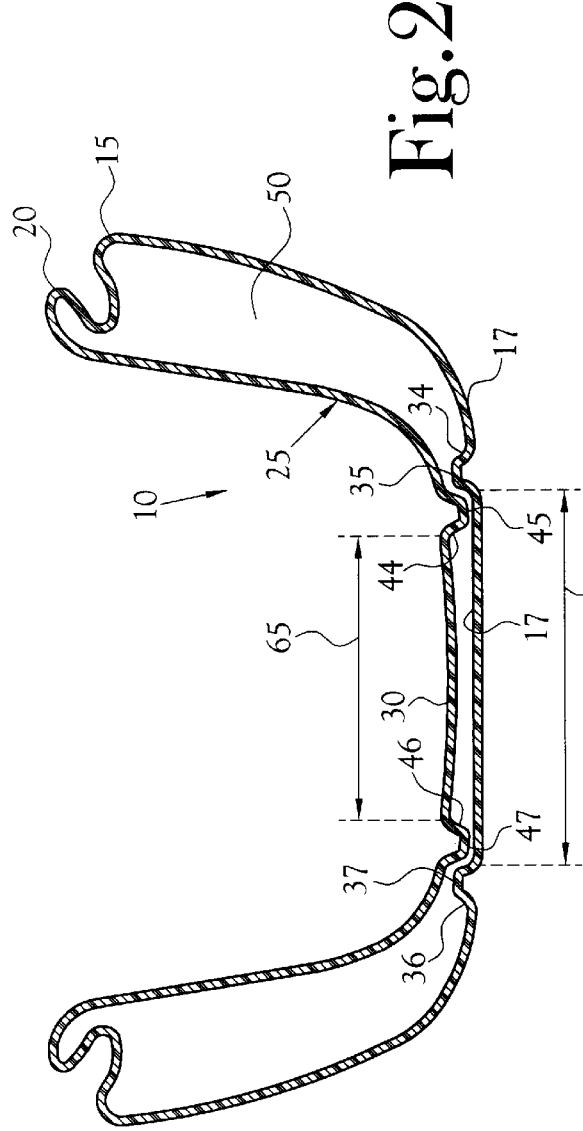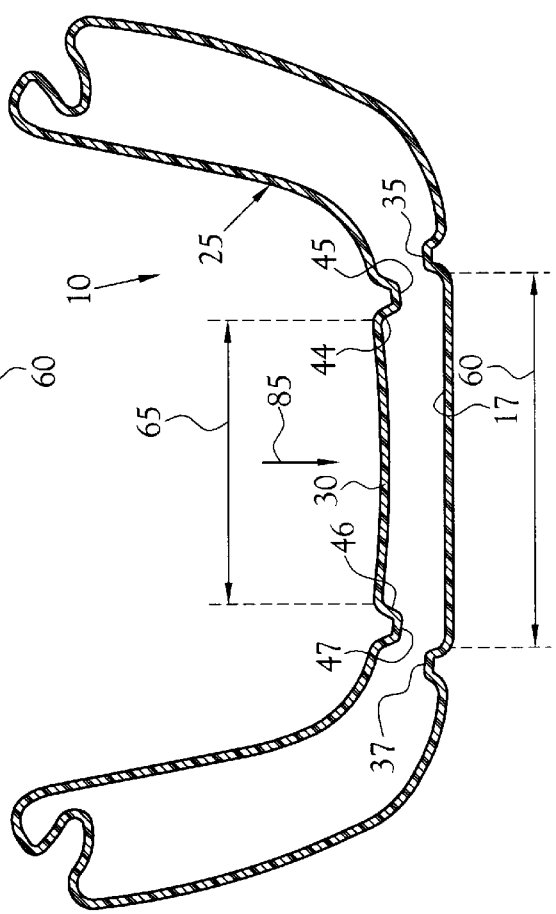

CAPTURED SEAT FOR SELF-PROPELLED WATERCRAFT AND METHOD FOR FORMING SAME

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to self propelled watercraft, such as, though not limited to, kayaks and the like. More particularly, it relates to a captured seat for watercraft, such as kayaks and the like, and a method of molding the same.

2. Description of the Related Art

In the art of molding plastic watercraft, such as kayaks and the like, it is known to use ridges to brace, or strengthen, substantially planar surfaces such as the bottom of the hull, the deck and/or the seat bottom. Also, typically the seat is molded to be integral with the hull. Typically, the ridges that strengthen the bottom of the seat are raised above the ridges that strengthen the bottom of the hull of the kayak. This results in a seat that presents a high center of gravity within the cockpit when an occupant is present. Moreover, the seat is subject to unwanted lateral, or side to side, displacement within the cockpit. Also, it is known that during the molding process, the molten plastic material comprising the hull material can bridge from the ridges of the bottom of the hull to the ridges of the seat bottom, resulting in deformations often referred to as "kiss-offs". This bridging can result in undesirable hull deformations and mold breaks.

What is needed in the art is a vessel, such as a kayak, having seat that allows for a lower center of gravity and that resists undesired lateral displacement within the cockpit of the kayak. What is further missing from the art is a method of molding a vessel, such as a kayak having a low center of gravity seat which resists bridging of plastic from the seat bottom to the bottom of the hull during the molding process.

Accordingly, it is an object of the present invention to provide a captured seat which has a lower center of gravity than traditional seats.

It is a further object of the present invention to provide a captured seat which resists undesired lateral displacement within the cockpit of the kayak.

Still another object of the present invention is to provide a method of molding a vessel, such as a kayak, which prevents bridging of plastic resin from the bottom of the hull to the bottom of an integral seat.

Other objects and advantages over the prior art will become apparent to those skilled in the art upon reading the detailed description together with the drawings as described as follows.

BRIEF SUMMARY OF THE INVENTION

In accordance with the various features of this invention, a captured seat for a vessel, such as a kayak or the like, is provided. Further, a method of molding a kayak so as to prevent bridging of plastic resin between the bottom of the hull and the bottom of the seat is also provided. According to one embodiment of the present invention, a self-propelled watercraft referred to herein as a vessel, such as, though not limited to, a kayak or the like, includes a hull having a bottom and a planar seat. At least two ridges in spaced relation from one another are provided in the hull bottom in spaced relation from one another. Likewise, at least two ridges in spaced relation from one another, are provided in seat bottom. In one embodiment, the distance between ridges disposed in the hull bottom is greater than the distance between the ridges disposed in the seat bottom such that ridges disposed in the seat bottom are captured by the ridges disposed in the hull bottom, thus preventing undesired lateral movement of the seat within the interior volume of the hull. This also allows the seat to be positioned lower in the hull than with a traditional seat, thus lowering the center of gravity for the vessel, when an occupant is seated, making the vessel more stable in the water. In order to prevent undesired bridging of molten plastic between ridges disposed in the hull bottom and the ridges disposed in the seat bottom during the molding process, the seat is molded in an elevated position. Upon removal of the vessel from the mold, i.e. after skinning, but while the thermomolded plastic is still pliable, the seat is pressed downward into the desired lower position. The plastic is allowed to reach room temperature and the plastic hardens sufficiently for the vessel to retain this configuration.

BRIEF DESCRIPTION OF THE SEVERAL VIEWS OF THE DRAWINGS

The above-mentioned features of the invention will become more clearly understood from the following detailed description of the invention read together with the drawings in which:

FIG. 2 is a cross-sectional view of the kayak illustrated in FIG. 1 taken at line 2—2.

FIG. 3 is a cross-sectional view as shown in FIG. 2 illustrating the formation of the kayak when molded according to the molding process of the present invention.

DETAILED DESCRIPTION OF THE INVENTION

Figure 1:
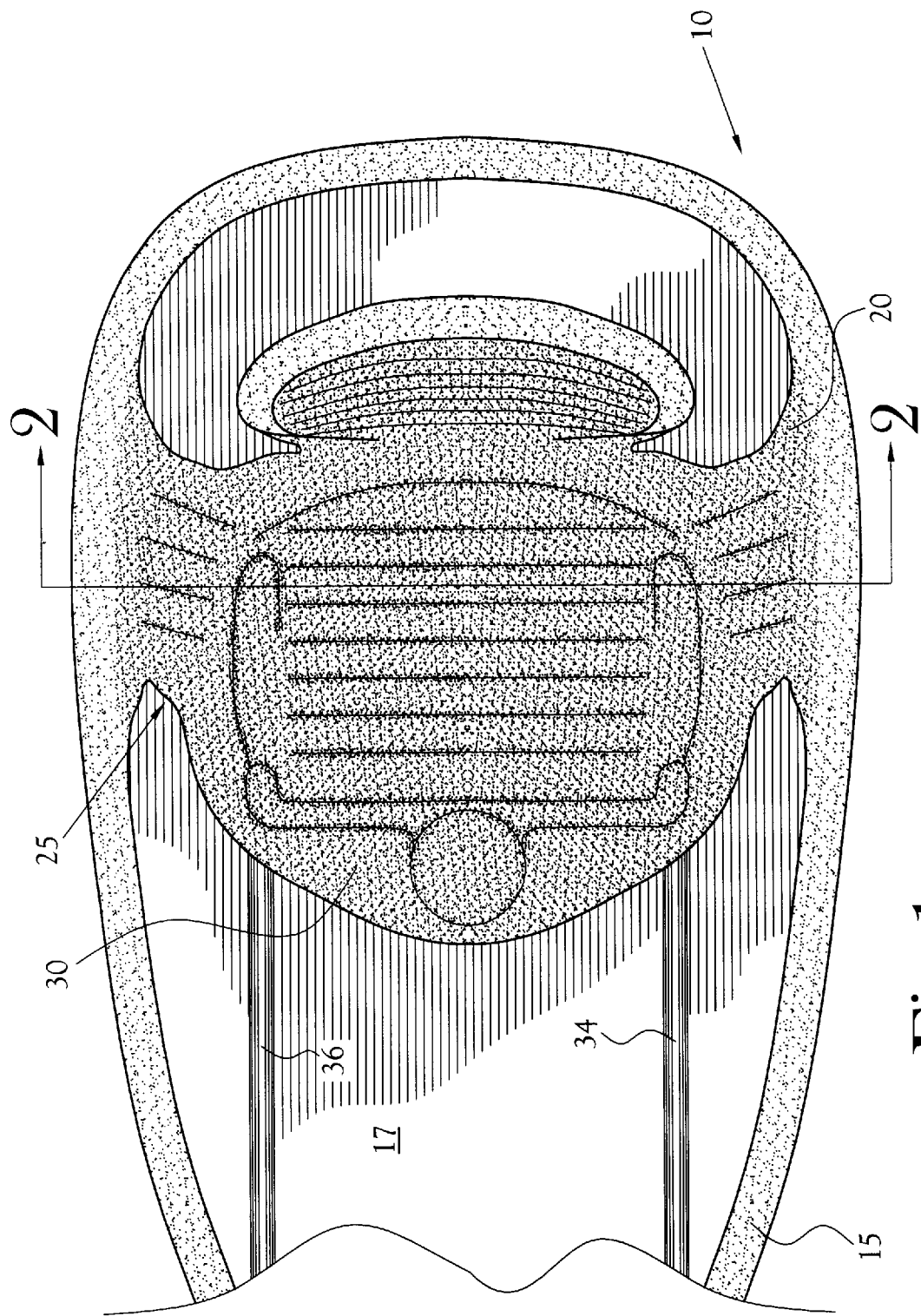
FIG. 1 is a perspective view of a kayak having a captured seat in accordance with the present invention.

A self-propelled watercraft referred to herein as vessel, such as, though not limited to, a kayak or the like, is illustrated generally as 10 in the figures. It will be understood that vessel 10 includes a hull 15, of selected contour for contact with the water, having a bottom 17, a cockpit rim 20 defining a cockpit region to receive a user (not shown) and a seat 25 having a bottom 30. It will be recognized that seat bottom 30 is substantially planar. It will also be recognized that in certain vessels, such as vessel 10, hull bottom 17 is also substantially planar. And, it is well known in the arts that forming a ridge in a substantially planar member will strengthen such a planar member and will allow such a planar member to resist flexing. In this regard, as shown in FIGS. 1 and 2, hull bottom 17 has at least two ridges 34 and 36, in spaced relation from one another, formed therein.

Likewise, seat bottom 30 has at least two ridges 44 and 46, in spaced relation from one another, formed therein. Ridges 34, 36, 44 and 46 include distal ends 35, 37, 45, and 47, respectively. Further, as best illustrated in FIG. 2, ridges 34 and 36 and ridges 44 and 46, are convex with respect to the interior volume 50 of the hull 15. In this regard, the distal ends 35, 37, 45, and 47, of ridges 34, 36, 44 and 46, respectively are disposed within the interior volume 50 of the hull 15.

Figure 4:
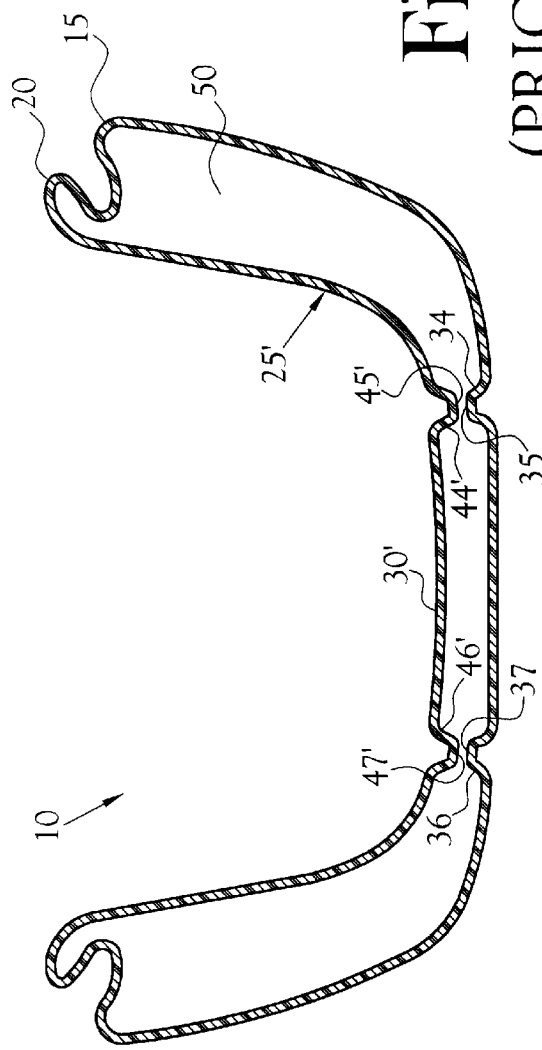
FIGS. 4 and 5 are cross-sectional views showing prior art configuration of the seat and hull bottom and illustrating the bridging that can occur with traditional molding techniques.
Figure 5:
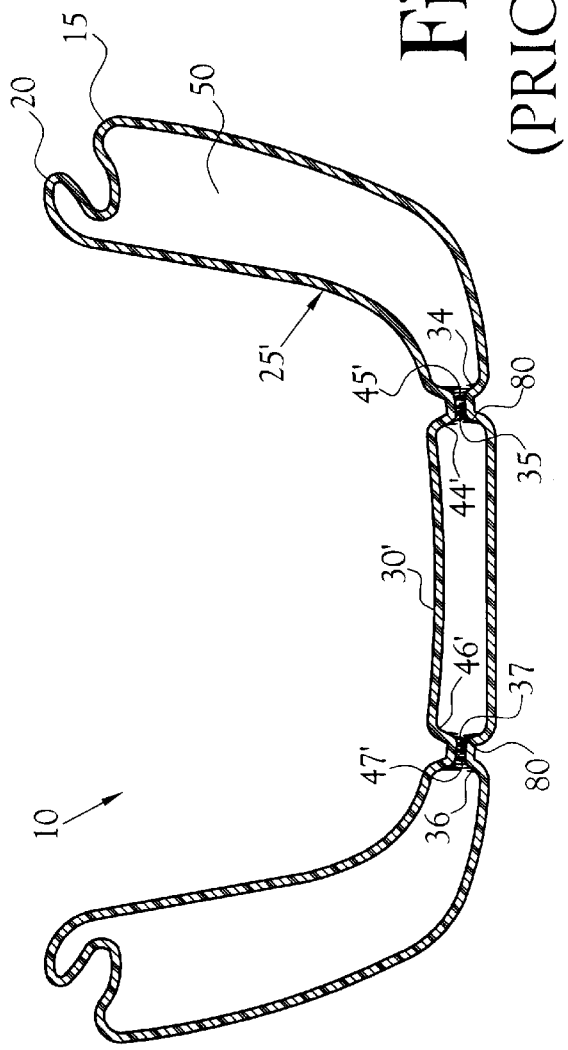

Referring to FIGS. 4 and 5, a prior art embodiment is illustrated with common components bearing the same reference numerals. Comparable but distinctive parts bear the same reference numeral with the prime notation added, and parts not previously described bear their own reference numerals. In this regard, prior art vessel 10' includes a hull 15 having a bottom 17, a cockpit rim 20 and a seat 25' having a bottom 30'. Hull bottom 17 has at least two ridges 34 and 36, in spaced relation from one another, formed therein. Likewise, seat bottom 30' has at least two ridges 44' and 46', in spaced relation from one another, formed therein. As described above, Ridges 34, 36, 44' and 46' include distal ends 35, 37, 45', and 47', respectively. In the traditional vessel, as illustrated in FIG. 4 with respect to vessel 10', the spacing between ridges 34 and 36 is substantially equal to the spacing between ridges 44' and 46' such that distal ends 35 and 37 are in substantial vertical alignment with distal ends 45' and 47'. This can allow undesired lateral displacement of the seat 25' within the interior volume 50 of the hull 15. This arrangement also raises the seat bottom 30' above the bottom 17 of the hull 15 a distance substantially equal to the combined vertical height of ridges 37 and 47'. Two of the objects of the present invention are to overcome these problems.

Figure 2A:
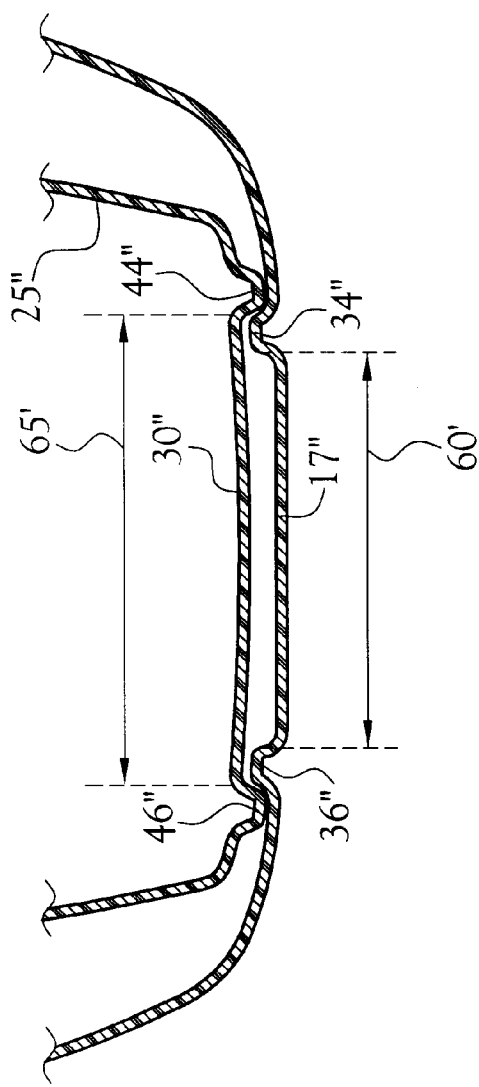
FIGS. 2A and 2B illustrate alternate embodiments of the kayak illustrated in FIG. 2.
Figure 2B:
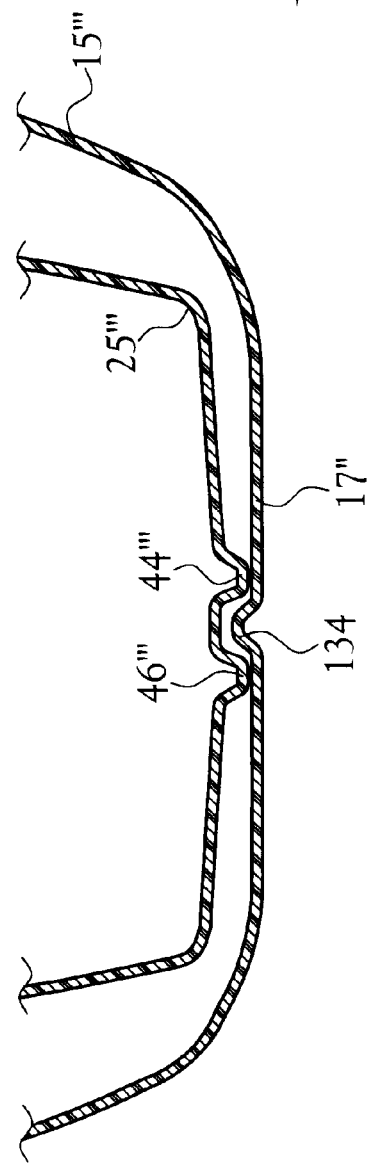

In accordance with the present invention, ridges disposed in the seat bottom 30 and the hull bottom 17 cooperate to capture the seat 25 and substantially reduce undesired lateral movement of the seat 25 within the cockpit region of the hull. In this regard, in one embodiment, ridges 44 and 46 are positioned so as to be positioned within, or captured by, ridges 34 and 36 as illustrated in FIG. 2. In this regard, ridges 44 and 46 are molded into the seat bottom 30 and ridges 34 and 36 are molded into the hull bottom 17 such that the distance 60 between ridges 34 and 36 is greater than the distance 65 between ridges 44 and 46. And, the seat 25 is positioned lower in the hull than with a traditional seat. It will be appreciated that this will lower the center of gravity for the vessel 10 when a user is seated therein, thus making the vessel 10 more stable in the water. Further, as stated above, ridges 44 and 46 are captured by ridges 34 and 36, as seen in FIG. 2, thus preventing undesired lateral movement of the seat 25 within the interior volume 50 of the hull 15. It will be recognized that other ridge configurations will serve to lower the seat within the vessel and to capture the seat so as to prevent undesired lateral movement of the seat. In this regard, as illustrated in FIG. 2A, ridges 44" and 46" are molded into the seat bottom 30" and ridges 34" and 36" are molded into the hull bottom 17 such that the distance 60' between ridges 34" and 36" is shorter than the distance 65' between ridges 44" and 46" . Alternately, a single ridge molded in either the hull bottom 17''' or the seat bottom 30''' could be captured by a pair of ridges molded in either the seat bottom 30''' or the hull bottom 17''', respectively. For example, as depicted in FIG. 2B, a single ridge 134 molded into the hull bottom 17''' is captured by a pair of ridges 44''' and 46''' molded into seat bottom 17'''.

Vessels, such as kayaks, are often formed of a thermomolded plastic. It is known that a rotational molding process can be utilized to manufacture vessels, such as, though not limited to, kayaks. In this regard, a quantity of a selected polyethylene powder is introduced into a mold having an internal surface corresponding to a desired kayak surface shape. The mold is heated, while being rotated, such that the powder is transformed into a molten plastic state to form the kayak hull. Upon a complete transformation of the powder and distribution throughout the mold, the mold is cooled and removed from the kayak hull. Thereafter, any finishing details are performed to complete the fabrication of the kayak. In one embodiment, the mold typically has a bottom portion and a top portion, with these portions being separable at a horizontal parting line generally midway between a top surface and a bottom surface of the resultant kayak. During pre-heat and the molding process, the two portions are joined using clamps, bolts, etc. (not shown). Clamps, however, permit the most rapid joining and separating steps. The mold is positioned within an oven having heating means to produce a desired temperature distribution to the exterior, and thus the interior, of the mold. Further, provision is made to rotate the mold at a selected speed (e.g., a few RPM) of revolution during heating. Other motions of the mold can be utilized, if desired, such as rocking the mold.

Figure 6:
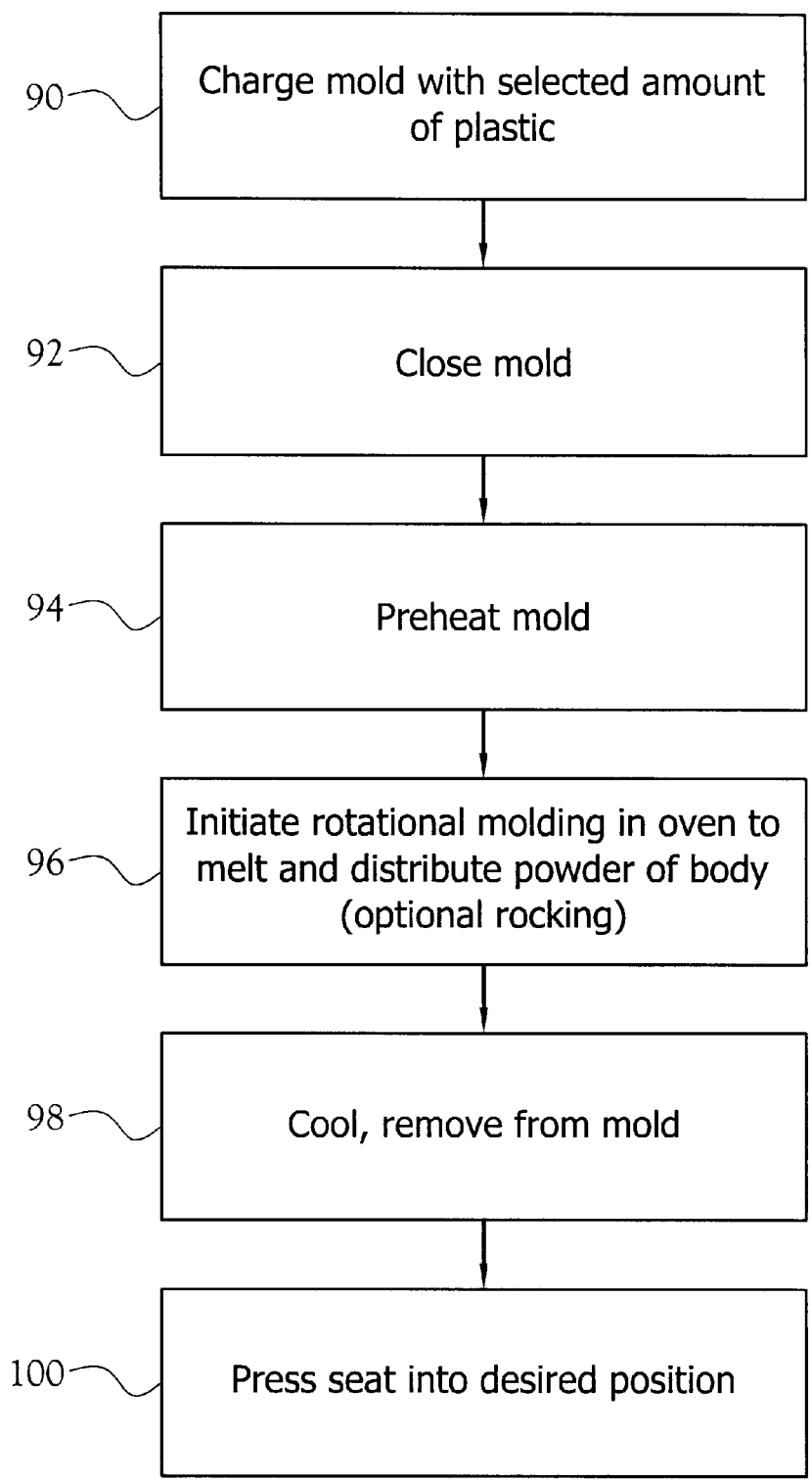
FIG. 6 is a flow diagram outlining the steps of the method of the current invention.

The present invention is illustrated regarding a specific application: that of forming a kayak hull containing a captured seat having a lower center of gravity than traditional kayak configurations. Referring now to FIG. 6, a mold (not shown) is charged with a selected amount of polyethylene powder (not shown) 90. This typically is 25 to 55 pounds of polyethylene powder having a particle size of about thirty-five (35) Mesh. The amount depends upon the size of the desired kayak. Different types of polyethylene are typically utilized, the choice being the ultimate strength of the kayak. These types include linear low density polyethylene, medium density polyethylene, high density polyethylene, and cross-linked polyethylene. The latter forms a kayak of greatest strength—as needed for kayaks for white water use. This cross-linked material requires a longer heating time in the mold. The charged mold is then closed 92 and preheated 94 (from the exterior) in order to raise the temperature of the powders to form a skin over the powders. This pre-heat is also used in other portions of the mold to increase the hull thickness at selected locations. The preheating can be accomplished using a torch or other forms of auxiliary heaters specifically for this purpose.

After closure of the mold, and the "skinning" has been achieved, the overall mold is moved into an oven where it is heated to achieve an inner mold surface temperature of at least 275° F. which is the transition temperature for the polyethylenes. The oven temperature to achieve the necessary internal temperature ranges from 450°–700° F. Temperature distributions are used within the oven to achieve selected hull thickness. During the heating, which typically lasts twenty to sixty minutes, or longer depending upon the amount of the charge and the type of polyethylene, the mold is slowly rotated 96 so that the powder charge is moved to all portions of the mold. The typical rotation is 3–7 RPM. Other mold movement, such as mold rocking, may be used with the rotation to assist in the powder and molten powder distribution.

Upon achieving the desired temperature throughout the surface of the mold such that the plastic is molten, the mold is brought to substantially room temperature while continuing the mold rotation. Typically this cooling requires about thirty minutes up to about one hour. At this point the plastic has skinned and is no longer molten. While the hull is firm, it will be recognized by those skilled in the art that the plastic is also sufficiently pliable such that the kayak can be removed from the mold for final detailing of the kayak.

Also, it is known that during the molding process, the molten plastic material comprising the hull material can bridge 80 from the ridges 34 and 36 of the hull bottom 17 to the ridges 44' and 46', respectively, of the seat bottom 30', resulting in deformations often referred to as "kiss-offs". This bridging 80 illustrated in FIG. 5, can result in undesirable hull deformations and mold breaks. This bridging 80 would be especially prominent in a vessel 10 constructed as illustrated in FIG. 2. In order to compensate for this, and thus, substantially reduce, if not completely eliminate the bridging 80, the seat 25 is molded in an elevated position, as illustrated in FIG. 3. Upon removal of the vessel 10 from the mold 98, i.e. after skinning, but while the thermomolded plastic is still pliable, the seat 25 is pressed downward 100 in the direction of arrow 85 to the position and configuration depicted in FIG. 2. The plastic is allowed to reach room temperature and the plastic hardens sufficiently for the vessel 10 to retain this configuration.

From the forgoing description, it will be recognized by those skilled in the art that a vessel, such as a kayak, having seat that allows for a lower center of gravity and that resists undesired lateral displacement within the cockpit of the kayak, and a method of molding a vessel, such as a kayak having a low center of gravity seat which resists bridging of plastic from the seat bottom to the bottom of the hull during the molding process have been provided. Specifically, the present invention provides vessel, such as a kayak, having a captured seat which has a lower center of gravity than traditional seats, and which resists undesired lateral displacement within the cockpit of the kayak. Further, the present invention provides a method of molding a vessel, such as a kayak, which prevents bridging of plastic resin from the bottom of the hull to the bottom of an integral seat.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, I claim:

1. A watercraft, said watercraft having a hull of selected contour for contact with the water, said watercraft having a cockpit region to receive a user, said watercraft comprising:
    a seat member having a substantially planar seat bottom received within said cockpit region of said watercraft;
    cooperating ridges disposed in a bottom surface of said hull and in said seat bottom, whereby said ridges cooperate to capture said seat member within said cockpit region thereby substantially preventing lateral movement of said seat member within said cockpit region.

2. The watercraft of claim 1 wherein at least two ridges in spaced relation are disposed in said bottom surface of said hull a first selected distance apart and wherein at least two ridges in spaced relation are disposed in said seat bottom a second selected distance apart, wherein said first selected distance is greater than said second selected distance.

3. The watercraft of claim 1 wherein at least two ridges in spaced relation are disposed in said bottom surface of said hull a first selected distance apart and wherein at least two ridges in spaced relation are disposed in said seat bottom a second selected distance apart, wherein said first selected distance is shorter than said second selected distance.

4. The watercraft of claim 1 wherein at least two ridges in spaced relation are disposed in said bottom surface of said hull and wherein at least one ridge is disposed in said seat bottom so as to be engageable by said at least two ridges disposed in said bottom surface of said hull.

5. The watercraft of claim 1 wherein at least two ridges in spaced relation are disposed in said seat bottom of said seat member and wherein at least one ridge is disposed in said bottom surface of said hull so as to be engageable by said at least two ridges disposed in said seat bottom.

6. The watercraft of claim 1 wherein said bottom surface of said hull is substantially planar.

7. The watercraft of claim 6 wherein at least two ridges in spaced relation are disposed in said bottom surface of said hull a first selected distance apart and wherein at least two ridges in spaced relation are disposed in said seat bottom a second selected distance apart, wherein said first selected distance is greater than said second selected distance.

8. The watercraft of claim 6 wherein at least two ridges in spaced relation are disposed in said bottom surface of said hull a first selected distance apart and wherein at least two ridges in spaced relation are disposed in said seat bottom a second selected distance apart, wherein said first selected distance is shorter than said second selected distance.

9. The watercraft of claim 6 wherein at least two ridges in spaced relation are disposed in said bottom surface of said hull and wherein at least one ridge is disposed in said seat bottom so as to be engageable by said at least two ridges disposed in said bottom surface of said hull.

10. The watercraft of claim 6 wherein at least two ridges in spaced relation are disposed in said seat bottom and wherein at least one ridge is disposed in said bottom surface of said hull so as to be engageable by said at least two ridges disposed in said bottom surface of said hull.

11. The watercraft of claim 1 wherein said seat is integral with said hull.

12. A method of forming a watercraft using plastic powders and a mold having an internal cavity, which comprises the steps:
    charging the mold with a quantity of loose plastic powder in an amount sufficient to form the watercraft, wherein said mold is configured so as to form a seat in said watercraft, said seat for said watercraft being in a raised position;
    preheating an exterior of the mold by locally heating selected portions of the exterior of the mold at selected positions to a temperature proximate a transition temperature of the plastic powders to form a skin on at least the plastic powder;
    continuing heating of the mold in its entirety to at least the transition temperature of the plastic powder for a time sufficient to convert the plastic powders to a molten state;
    rotating the mold during the continuing heating step to distribute molten plastic powder over the inner surface of the cavity of the mold to form the watercraft;
    cooling the heated mold containing the molded watercraft during continued rotating wherein said molten plastic powders skin and cool to a pliable state; and
    removing the watercraft from the mold and pressing the seat into a desired position.

13. The method of claim 12 wherein said seat is integral with a hull of said watercraft.

* * * * *